(12) United States Patent
Giamati

(10) Patent No.: US 11,117,672 B2
(45) Date of Patent: Sep. 14, 2021

(54) PNEUMATIC DEICER WITH RUNBACK CHANNELS

(71) Applicant: GOODRICH CORPORATION, Charlotte, NC (US)

(72) Inventor: Michael J Giamati, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 201 days.

(21) Appl. No.: 16/413,994

(22) Filed: May 16, 2019

(65) Prior Publication Data

US 2020/0361613 A1    Nov. 19, 2020

(51) Int. Cl.
    *B64D 15/16*         (2006.01)
    *B64D 15/12*         (2006.01)

(52) U.S. Cl.
    CPC ........... *B64D 15/166* (2013.01); *B64D 15/12* (2013.01)

(58) Field of Classification Search
    CPC ....... B64D 15/166; B64D 15/12; B64D 15/00
    See application file for complete search history.

(56) References Cited

U.S. PATENT DOCUMENTS

| 5,558,304 | A | * | 9/1996 | Adams | ................... | B64D 15/00 244/134 A |
|---|---|---|---|---|---|---|
| 6,269,320 | B1 | | 7/2001 | Otto | | |
| 8,338,785 | B2 | | 12/2012 | Ray | | |
| 8,430,359 | B2 | | 4/2013 | Al-Khalil | | |
| 2017/0266753 | A1 | * | 9/2017 | Schomer | ............... | B29C 66/244 |
| 2017/0266869 | A1 | * | 9/2017 | Schomer | ........... | B29C 66/81427 |
| 2017/0273148 | A1 | * | 9/2017 | Schomer | ........... | B29C 66/81427 |
| 2018/0009538 | A1 | | 1/2018 | Wilson | | |

FOREIGN PATENT DOCUMENTS

| EP | 0806342 | 11/1997 |
|---|---|---|
| EP | 2862804 | 4/2015 |
| EP | 3266711 | 1/2018 |
| EP | 3594124 | 1/2020 |

OTHER PUBLICATIONS

European Patent Office, European Search Report dated Oct. 9, 2020 in Application No. 20174749.0.

* cited by examiner

*Primary Examiner* — Rodney A Bonnette
(74) *Attorney, Agent, or Firm* — Snell & Wilmer L.L.P.

(57) ABSTRACT

A runback system for receiving fluid from a deicing system may comprise a body and a first channel and a second channel defined by the body. A first end of the first channel may be spaced apart from a first end of the second channel. A second end of the first channel and a second end of the second channel may meet and form an outlet at an end of the body.

19 Claims, 4 Drawing Sheets

PNEUMATIC DEICER WITH RUNBACK CHANNELS

FIELD

The present disclosure relates generally to aircraft, and more specifically to deicing systems having a runback protection system.

BACKGROUND

A pneumatic deicer may include layers of fabric sewn together to create a series of tubes along an aircraft structure. The tubes may be inflated to dislodge ice from the aircraft structure. However, ice can form aft of the pneumatic deicers under certain conditions. For example, supercooled large water droplets may flow aft from the pneumatic deicers at warmer temperatures. The runback water can freeze aft of the deicers and form a spanwise ice ridge, which can affect aerodynamic lift, drag, and other aircraft conditions.

SUMMARY

A pneumatic deicer is disclosed herein. In accordance with various embodiments, the pneumatic deicer may comprise a forming layer defining a volume configured to inflate and to deflate and a covering layer located over the forming layer. The covering layer may define a runback system including a plurality of channels.

In various embodiments, the covering layer may comprise an elastomeric material. In various embodiments, a first channel of the plurality of channels and a second channel of the plurality of channels may be oriented in a V configuration. In various embodiments, an aft end of the first channel and an aft end of the second channel may meet and form an outlet at an aft end of the covering layer.

In various embodiments, a first channel of the plurality of channels may be defined by a floor and a pair of walls extending from the floor to an outer surface of the covering layer. The floor of the first channel may be sloped such that a distance between the floor of the first channel and an inner surface of the covering layer decreases in a forward to aft direction. The inner surface of the covering layer may be opposite the outer surface of the covering layer.

In various embodiments, the covering layer may be tapered such that a height of the covering layer extending from the inner surface of the covering layer to the outer surface of the covering layer decreases in the forward to aft direction. In various embodiments, a distance between the floor of the first channel and the outer surface of the covering layer may increase in the forward to aft direction.

An aircraft part is also disclosed herein. In accordance with various embodiments, the aircraft part may comprise a deicing system and a runback system configured to receive fluid from the deicing system. The runback system may comprise a first channel and a second channel. The first channel may be oriented at an angle relative to the second channel. A forward end of the first channel may be spaced apart from a forward end of the second channel. An aft end of the first channel and an aft end of the second channel may meet and form an outlet of the runback system.

In various embodiments, the deicing system may comprise a pneumatic deicer. The pneumatic deicer may include a forming layer defining a volume configured to inflate and to deflate and a covering layer located over the forming layer.

In various embodiments, the covering layer may define the runback system.

In various embodiments, an aft end of the covering layer may be located adjacent a forward end of the runback system.

In various embodiments, a distal surface of the runback system may be tapered such that a first height of the runback system at a forward end of the runback system is greater than a second height of the runback system at an aft end of the runback system.

In various embodiments, a proximal surface of the runback system may be affixed to a surface of the aircraft part. In various embodiments, the aircraft part may comprise a wing of an aircraft. In various embodiments, the aircraft part may comprise at least one of a horizontal stabilizer, a vertical stabilizer, or a nacelle inlet.

In various embodiments, the deicing system may comprise an electrothermal deicer.

A runback system configured to receive fluid from a deicing system is also disclosed herein. In accordance with various embodiments, the runback system may comprise a body, a first channel defined by the body, and a second channel defined by the body. A first end of the first channel may be spaced apart from a first end of the second channel. A second end of the first channel and a second end of the second channel may meet and form an outlet at a first end of the body.

In various embodiments, the first channel may comprise a floor and a pair of walls extending from the floor to a first surface of the body.

In various embodiments, a distance between the floor and a second surface of the body opposite the first surface of the body may decrease in a direction extending from a second end of the body to the first end of the body, the second end of the body being located opposite the first end of the body.

In various embodiments, the body may be tapered such that a height of the body extending from the first surface of the body to a second surface of the body opposite the first surface decreases in a direction extending from a second end of the body to the first end of the body, the second end of the body being located opposite the first end of the body.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the trailing edge (e.g., the back end) of an aircraft structure. As used herein, "forward" refers to the direction associated with the leading edge (e.g., the front end) of an aircraft structure.

A first component that is "normally outward" of a second component means that a first component is positioned at a greater distance away from the surface of the aircraft structure, as measured along a vector perpendicular to a tangent of the surface of the aircraft structure at the location of the first component, than the second component. A first component that is "normally inward" of a second component means that the first component is positioned at a lesser distance away from the surface of the aircraft structure, as measured along a vector perpendicular to a tangent of the surface of the aircraft structure at the location of the first component, than the second component.

Figure 1:
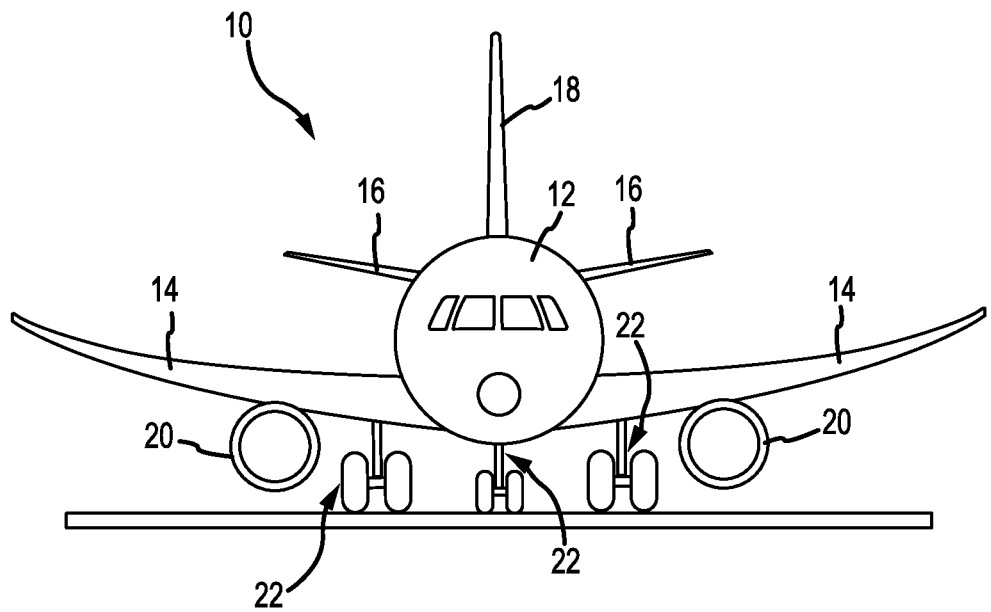
FIG. 1 illustrates an aircraft, in accordance with various embodiments.

With reference to FIG. 1, an aircraft 10 is illustrated, in accordance with various embodiments. Aircraft 10 includes a fuselage 12 and wings 14. In various embodiments, aircraft 10 may include one or more horizontal stabilizer(s) 16 and/or one or more vertical stabilizer(s) 18. Aircraft 10 includes one or more nacelle(s) 20 and landing gear assembly 22. Nacelle 20 may surround a gas turbine engine. Landing gear assemblies 22 may generally support aircraft 10, when aircraft 10 is not flying.

Figure 2:
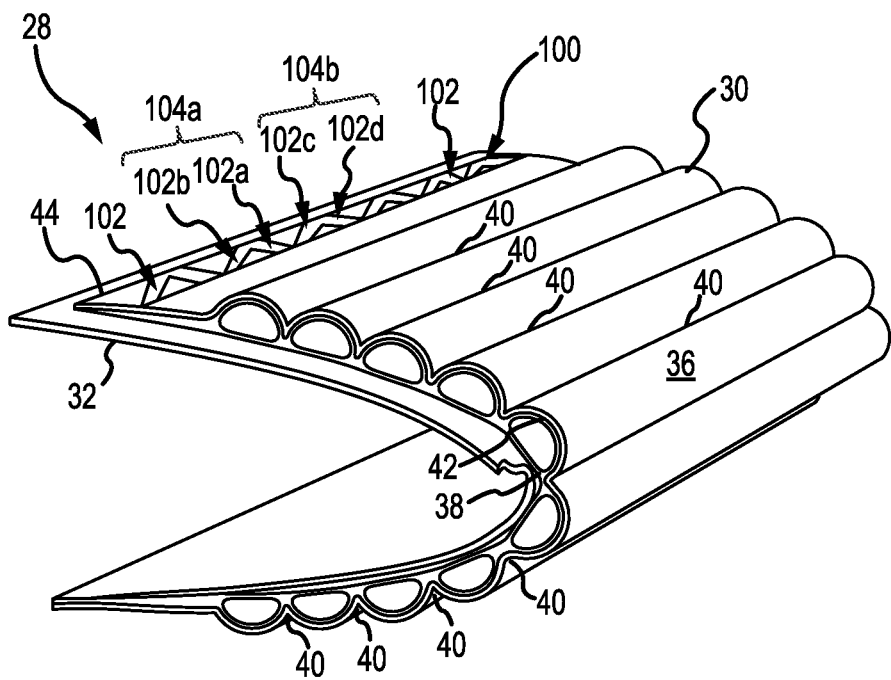
FIG. 2 illustrates a perspective view of an aircraft structure having a deicing system comprising a pneumatic deicer including a runback system, in accordance with to various embodiments.

With reference to FIG. 2, and continuing reference to FIG. 1, a deicing system 28 is illustrated, in accordance with various embodiments. Deicing system 28 may include a pneumatic deicer 30. Pneumatic deicer 30 is configured to deflate and inflate to dislodge ice from the aircraft. Pneumatic deicer 30 may be coupled to an aircraft structure 32. In various embodiments, pneumatic deicer 30 may be disposed along an airfoil. For example, pneumatic deicer 30 may be disposed along the leading edge of an airfoil, such as wing 14, horizontal stabilizer 16, and/or vertical stabilizer 18 of aircraft 10. Pneumatic deicer 30 may be also be disposed along a suction side and/or a pressure side of an airfoil. Pneumatic deicer 30 may also be coupled to an inlet of nacelle 20 and/or to landing gear assembly 22. In this manner, any portion of an aircraft susceptible to ice buildup may be equipped with a pneumatic deicer 30.

Pneumatic deicer 30 may comprise a covering layer 36, a forming layer 42, boot seams 40, and a base layer 38. As illustrated in FIG. 2, pneumatic deicer 30 may be oriented with boot seams 40 perpendicular to the chord of aircraft structure 32. In various embodiments, pneumatic deicer 30 may be oriented with boot seams 40 parallel to the chord of aircraft structure 32.

Base layer 38 may comprise a fabric layer. For instance, base layer 38 may comprise a substantially inelastic fabric. The base layer 8 may however comprise any material as desired. In general, base layer 38 resists stretching and distorting during inflation and deflation of the pneumatic deicer 30. Base layer 38 may be disposed on and/or may be affixed to aircraft structure 32.

Forming layer 42 may comprise an elastic fabric. For instance, forming layer 42 may comprise an elastomeric material. Forming layer 42 may however comprise any material as desired. In general, forming layer 42 stretches during the inflation and deflation of pneumatic deicer 30. As such, forming layer 42 and base layer 38 may comprise different materials. Forming layer 42 is disposed on and/or affixed to base layer 38. Forming layer 42 and base layer 38 may be joined together by boot seams 40. Boot seams 40 comprise stitching extending through base layer 38 and forming layer 42. Boot seams 40 are spaced and arranged to form tube structures from the union of base layer 38 and forming layer 42. Boot seams 40 may substantially seal forming layer 42 and base layer 38 against fluidic leakage at each boot seam 40. As such, compressed fluid, for example, air may be pumped between forming layer 42 and base layer 38. In response to receiving the compressed fluid, forming layer 42 may expand. As forming layer 42 expands, a series of ridges (e.g., raised tubular structures) may form in pneumatic deicer 30. The raised tubular structure may dislodge ice from aircraft structure 32 in response the expansion of forming layer 42.

Covering layer 36 may comprise an elastomeric material. In various embodiments, the covering layer 36 comprises rubber. For example, covering layer 36 may comprise neoprene. However, covering layer 36 may comprise any elastomer as desired. Covering layer 36 may exert a force counter (i.e., opposite) to the force exerted by the compressed fluid pumped into pneumatic deicer 30 to expand forming layer 42. Covering layer 36 may be configured to exert a force on forming layer 42 to compress forming layer 42 to a substantially flat position upon the withdrawal of the compressed fluid from forming layer 42. In this manner, as pneumatic deicer 30 is deflated, pneumatic deicer 30 may conform to a shape corresponding to that of underlying aircraft structure 32. Covering layer 36 may protect forming layer 42 from damage, such as from puncturing by ice.

In accordance with various embodiments, pneumatic deicer 30 may include a runback system 100. In various embodiments, runback system 100 may be formed in covering layer 36. Stated differently, covering layer 36 may define runback system 100. Runback system 100 may be located at an aft end 44 of covering layer 36 and pneumatic deicer 30. In various embodiments, runback system 100 may be located aft of the tubular structures formed by forming layer 42.

Figure 3A:
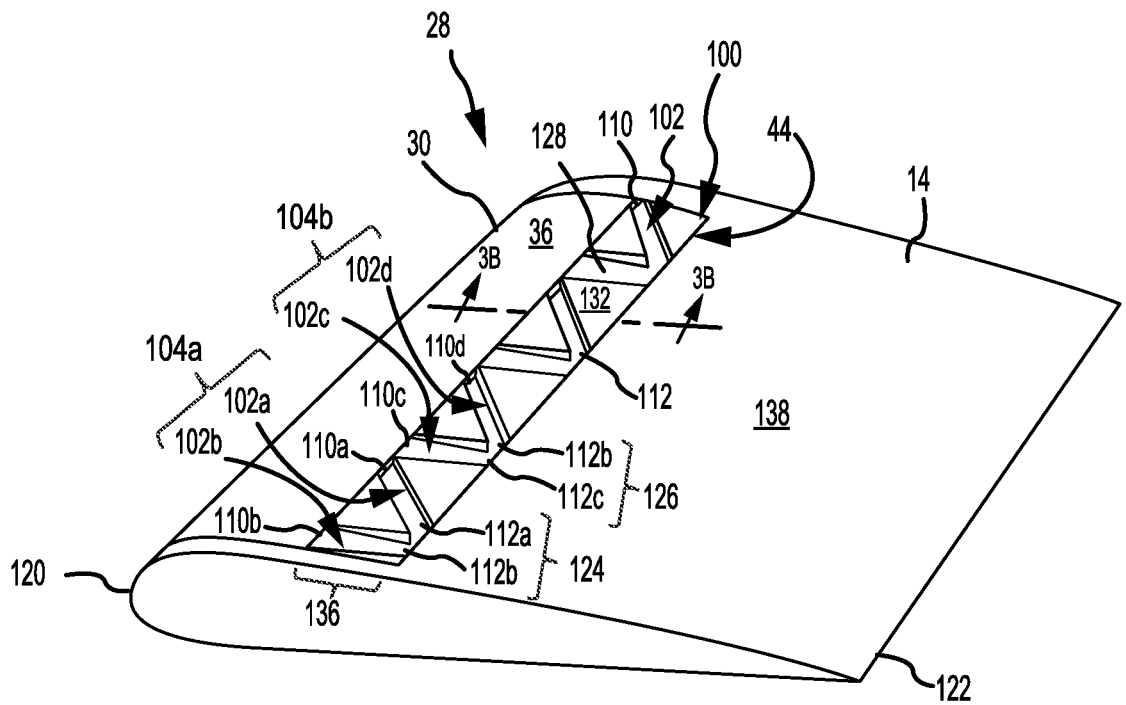
FIG. 3A illustrates a perspective view of a pneumatic deicer including a runback system attached to an aircraft wing, in accordance with various embodiments.

With reference to FIG. 3A, deicing system 28, including pneumatic deicer 30 and runback system 100, is illustrated coupled to wing 14 of aircraft 10. In accordance with various embodiments, wing 14 includes a leading edge 120 and a trailing edge 122. Pneumatic deicer 30 may be coupled proximate leading edge 120.

In accordance with various embodiments, runback system 100 includes a plurality of channels 102. Channels 102 may be defined by covering layer 36 of pneumatic deicer 30. Channels 102 are configured to receive aftward flowing fluid (e.g., water). Stated differently, channels 102 may receive water flowing in a direction extending from leading edge 120 to trailing edge 122. Channels 102 each include a forward (or first) end 110 and an aft (or second) end 112 located opposite the forward end 110. Adjacent channels 102 may be angled relative to one another such that aft ends 112 of various pairs of channels 102 meet and form an outlet at aft end 44 of covering layer 36. Stated differently, in various embodiments, channels 102 may be oriented in a "V" configuration. An apex of each V formed by channels 102 may be located at aft end 44 of covering layer 36.

In various embodiments, for example, a first pair 104a of channels 102 may include a first channel 102a and a second channel 102b. First channel 102a may be angled relative to second channel 102b such that the forward end 110a of first channel 102a is spaced apart in a spanwise direction from the forward end 110b of second channel 102b and the aft end 112a of first channel 102a and the aft end 112b second channel 102b meet and form a first outlet 124 at the apex of the V formed by first channel 102a and second channel 102b. A second pair 104b of channels 102 may include a third channel 102c and a fourth channel 102d. Third channel 102c may be angled relative to first channel 102a such that the forward end 110c of third channel 102c is located immediately adjacent in the spanwise direction to the forward end 110a of first channel 102a and the aft end 112c of third channel 102c is spaced apart from aft end 112a of first channel 102a in the spanwise direction. Third channel 102c may be angled relative to fourth channel 102d such that the forward ends 110c, 110d of third channel 102c and fourth channel 102d are spaced apart in the spanwise direction and the aft ends 112c, 112d of third channel 102c and fourth channel 102d meet to form a second outlet 126 at the apex of the V formed by third channel 102c and fourth channel 102d. The V configuration of first and second channels 102a, 102b directs water entering first channel 102a or second channel 102b toward first outlet 124. The V configuration of third and fourth channels 102c, 102d directs water entering third channel 102c or fourth channel 102d toward second outlet 126. The water exiting first outlet 124 and/or second outlet 126 may flow in the forward to aft direction (i.e., the leading edge 120 to trailing edge 122 direction), as opposed to the spanwise direction. In this regard, the V configuration of channels 102 may prevent or reduce occurrences of ice ridges forming across wing 14 in the spanwise direction. The V configuration of channels 102 directs the runback water into multiple discrete points. If/when the runback refreezes, it will form individual buttons of ice extending in the forward to aft direction, as opposed to forming a spanwise ridge.

Figure 3B:
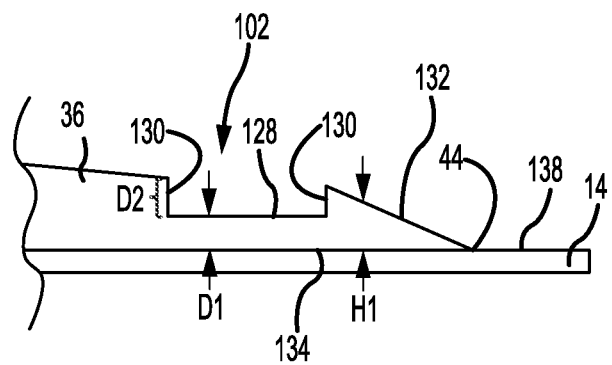
FIG. 3B illustrates a cross-section view of a pneumatic deicer including a runback system attached to an aircraft wing taken along the line 3B-3B in FIG. 3A, in accordance with various embodiments.

Referring to FIG. 3B, and with continued reference to FIG. 3A, a cross-sectional view of a channel 102 formed in covering layer 36 is illustrated, in accordance with various embodiments. Each channel 102 of runback system 100 may include a floor 128 and a pair of walls 130. Walls 130 extend from floor 128 to an outer surface 132 of covering layer 36. Outer surface 132 of covering layer is opposite, or oriented generally away from, an inner surface 134 of covering layer 36. Outer surface 132 is oriented away from wing 14 and/or away from forming layer 42, with momentary reference to FIG. 2. Inner surface 134 of covering layer 36 is oriented toward wing 14 and/or toward forming layer 42, with momentary reference to FIG. 2

With combined reference to FIGS. 3A and 3B, in various embodiments, the portion 136 of covering layer 36 that defines runback system 100 may be tapered. In this regard, a height H1 of portion 136 of covering layer 36 may decrease in a direction extending from leading edge 120 to trailing edge 122 (i.e., in a forward to aft direction). In various embodiments, floor 128 of channels 102 may be configured to have a downward slope in the forward to aft direction. For example, a distance D1 between floor 128 and inner surface 134 of covering layer 36 may decrease in the forward to aft direction, such that distance D1 proximate forward end 110 of channel 102 is greater than distance D1 proximate aft end 112 of channel 102. In various embodiments, the downward slope of floor 128 may be cause a distance D2 between floor 128 and outer surface 132 of covering layer 36 to increase in the forward to aft direction, such that distance D2 proximate forward end 110 of channel 102 is less than distance D2 proximate aft end 112 of channel 102. In various embodiments, floor 128 may be coplanar (or "flush") with a surface 138 of wing 14 at aft end 44 of covering layer 36. In various embodiments, floor 128 may be normally outward of surface 138 at aft end 44 of covering layer.

Figure 4:
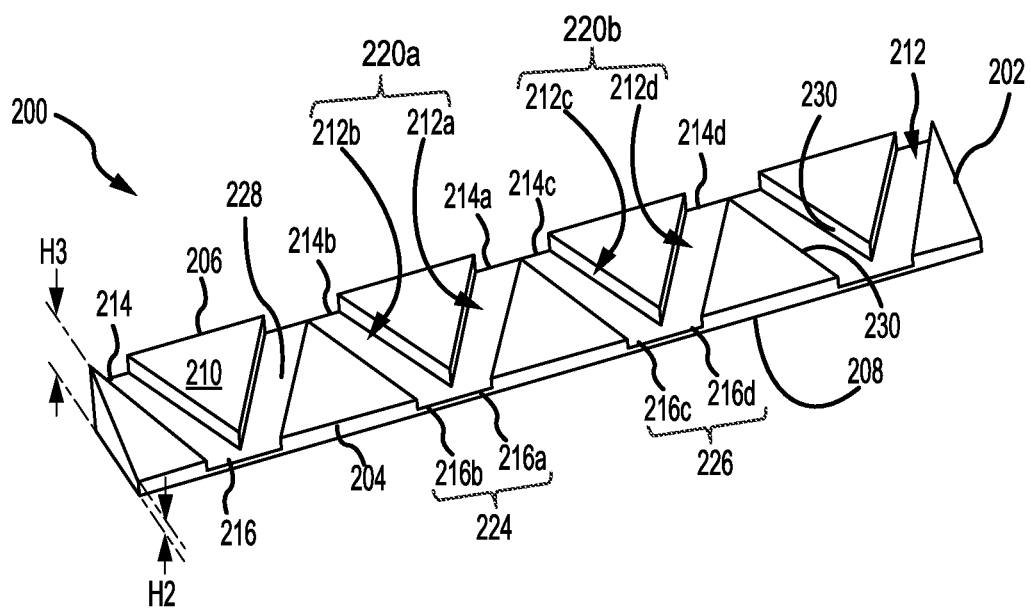
FIG. 4 illustrates a runback system having a tapered geometry, in accordance with various embodiments.

With reference to FIG. 4, a runback system 200 is illustrated in accordance with various embodiments. Runback system 200 may be coupled to an aircraft structure, for example, to wing 14, horizontal stabilizer 16, vertical stabilizer 18, an inlet of nacelle 20, and/or a landing gear assembly 22 of aircraft 10, with momentary reference to FIG. 1.

Runback system 200 includes a body 202. Body 202 may be formed from a metal or a metal alloy (e.g., aluminum, stainless steel, etc.), a plastic (e.g., polyethylene, polystyrene, polyvinyl chloride, etc.), an elastomeric material (rubber, neoprene, etc.), a composite (a ceramic fiber or carbon fiber composite), or any other desired material. Body 202 includes a first (or aft) end 204 and a second (or forward) end 206 opposite first end 204. A proximal (or first) surface 208 of body 202 may extend from first end 204 to second end 206. Body 202 includes a distal (or second) surface 210 opposite proximal surface 208. Distal surface 210 is oriented generally away from proximal surface 208.

Runback system 200 includes a plurality of channels 212. Channels 212 are defined by body 202. Channels 212 each include a first (or forward) end 214 and a second (or aft end) 216 located opposite the first end 214. First ends 214 of channels 212 are located at second end 206 of body 202. Second ends 216 of channels 212 are located at first end 204 of body 202. Channels 212 receive fluid from a deicing system at first end 214. Adjacent channels 212 may be angled relative to one another such that various pairs of second ends 216 meet and form outlets at first end 204 of body 202. Stated differently, in various embodiments, channels 212 may be oriented in a "V" configuration. An apex of each V formed by channels 212 may be located at first end 204 of body 202.

In various embodiments, for example, a first pair 220a of channels 212 may include a first channel 212a and a second channel 212b. First channel 212a may be angled relative to second channel 212b. The first end 214a of first channel 102a may be spaced apart along second end 206 of body 202 from the first end 214b of second channel 212b. Second end 216a of first channel 212a and second end 216b second channel 212b meet and form a first outlet 224 at the apex of the V formed by first channel 212a and second channel 212b. A second pair 220b of channels 212 may include third channel 212c and fourth channel 212d. Third channel 212c may be angled relative to first channel 212a such that first end 214c of third channel 212c is located immediately adjacent to first end 214a of first channel 212a and second end 216c of third channel 212c is spaced apart from second end 216a of first channel 212a along first end 204 of body 202. Third channel 212c may be angled relative to fourth channel 212d such that first ends 214c, 214d of third channel 212c and fourth channel 212d are spaced apart along second end 206 of body 202 and second ends 216c, 216d of third channel 212c and fourth channel 212d meet and form a second outlet 226 at the apex of the V formed by third channel 212c and fourth channel 212d.

Each channel 212 of runback system 200 may include a floor 228 and a pair of walls 230. Walls 230 extend from floor 228 to distal surface 210 of body 202. In various embodiments, body 202 may be tapered. In this regard, a height of body 202, as measured between distal surface 210 and proximal surface 208, may decrease in a direction extending from second end 206 to first end 204 of body 202. For example, body 202 has a height H3 at second end 206 and a height H2 at first end 204. Height H3 is greater than height H2.

In various embodiments, floor 228 of channels 212 may be configured to have a downward slope in the direction extending from second end 206 to first end 204 of body 202. For example, a distance between floor 228 and proximal surface 208 of body 202 may decrease in the direction extending from second end 206 to first end 204 of body 202. In various embodiments, the downward slope of floor 228 may be cause a distance between floor 228 and distal surface 210 of body 202 to increase in the direction extending from second end 206 to first end 204 of body 202.

Figure 5:
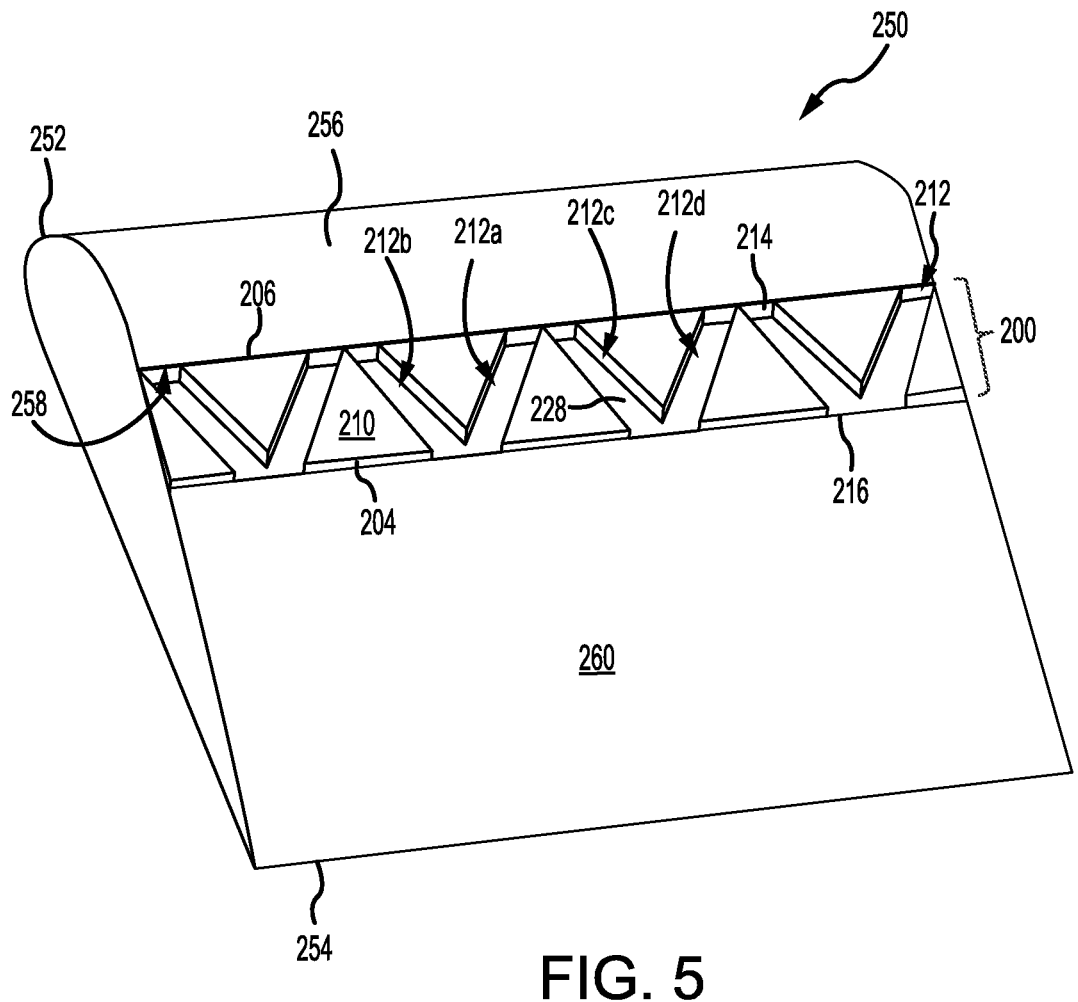
FIG. 5 illustrates a runback system attached to an aircraft struct aft of a deicing system, in accordance with various embodiments.

With reference to FIG. 5, an aircraft structure 250 including runback system 200 is illustrated, in accordance with various embodiments. Aircraft structure 250 includes a leading edge 252 and a trailing edge 254. Aircraft structure 250 may comprise a wing, horizontal stabilizer, vertical stabilizer, an inlet of a nacelle, or a landing gear assembly. Aircraft structure 250 includes a deicing system 256 at leading edge 252. In various embodiments, deicing system 256 may include a pneumatic deicer similar to pneumatic deicer 30 in FIG. 2. In various embodiments, deicing system 256 may comprise a thermoelectric deicing system configured to electrically heat deicing system 256 and aircraft structure 250.

Runback system 200 may be attached to aircraft structure 250 aft of deicing system 256. Second end 206 runback system 200 may be located adjacent an aft end 258 of deicing system 256. Channel 212 of runback system 200 may be configured to receive fluid (e.g., water) flowing aftward from deicing system 256. The V configuration of, for example, first and second channels 212a, 212b directs water entering first channel 212a or second channel 212b toward first outlet 224. The V configuration of third and fourth channels 212c, 212d directs water entering third channel 212c or fourth channel 212d toward second outlet 226. The water exiting first outlet 224 and/or second outlet 226 may flow in the forward to aft direction (i.e., the leading edge 252 to trailing edge 254 direction), as opposed to the spanwise direction. In this regard, the V configuration of channels 212 may prevent or reduce occurrences of ice ridges forming across aircraft structure 250 in the spanwise direction. The V configuration of channels 212 directs the runback water into multiple discrete points. If/when the runback refreezes, it will form individual buttons of ice extending in the forward to aft direction, as opposed to forming a spanwise ridge.

Runback system 200 may be coupled to a surface 260 of aircraft structure 250. Runback system 200 may be attached to aircraft structure 250 using adhesive, fasteners, welding, or any other suitable securement technique. In various embodiments, proximal surface 208 may be bonded or otherwise affixed to surface 260 of aircraft structure 250. In various embodiments, runback system 200 may be formed integrally with the outer skin or material of surface 260 of aircraft structure 250. For example, if surface 260 comprises a stamped metal, runback system 200 may be formed during the stamping process. As another example, runback system 200 may be machined into surface 260 of aircraft structure 250. In various embodiments, floor 228 of channels 212 may be coplanar (or "flush") with surface 260 of aircraft structure at first end 204 of runback system 200. In various embodiments, floor 228 may be normally outward of surface 260 at first end 204 of runback system 200.

Figure 6:
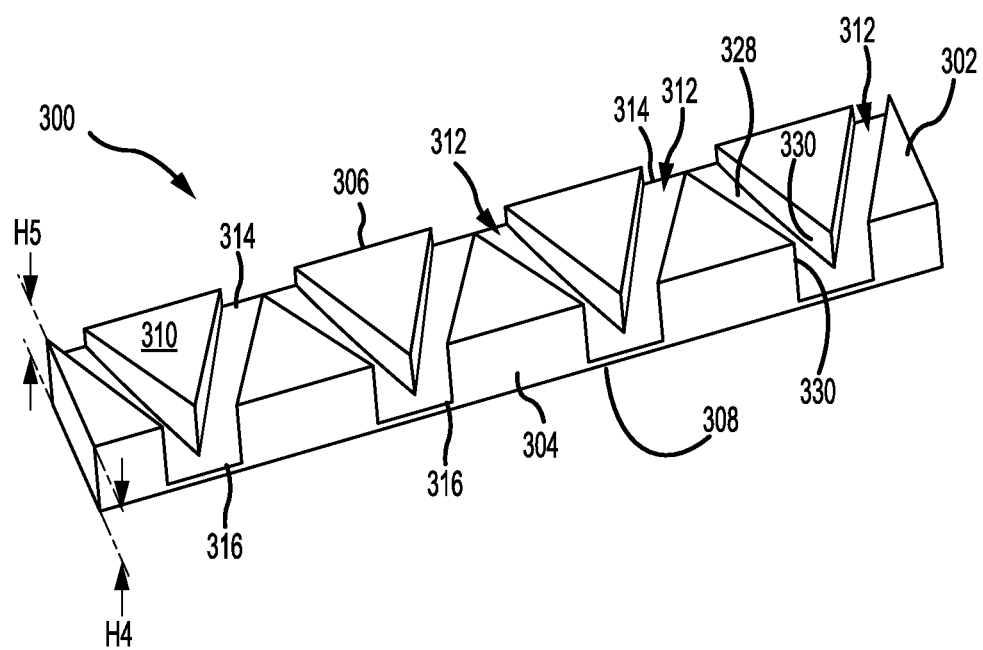
FIG. 6 illustrates a runback system for an aircraft component, in accordance with various embodiments.

With reference to FIG. 6, a runback system 300 is illustrated in accordance with various embodiments. Runback system 300 may be coupled to an aircraft structure, for example, to wing 14, horizontal stabilizer 16, vertical stabilizer 18, an inlet of nacelle 20, and/or a landing gear assembly 22 of aircraft 10, with momentary reference to FIG. 1. In various embodiments, runback system 300 may replace runback system 200, with momentary reference to FIG. 5, on aircraft structure 250.

Runback system 300 includes a body 302. Body 302 may be formed from a metal or a metal alloy, a plastic, elastomeric material, a composite, or any other desired material. Body 302 includes a first (or aft) end 304 and a second (or forward) end 306 opposite first end 304. A proximal (or first) surface 308 of body 302 may extend from first end 304 to second end 306. Body 302 includes a distal (or second) surface 310 opposite proximal surface 308. Distal surface 310 is oriented away from proximal surface 308.

Runback system 300 includes a plurality of channels 312. Channels 312 are defined by body 302. Channels 312 each include a first (or forward) end 314 and a second (or aft end) 316 located opposite the first end 314. First ends 314 of channels 312 are located at second end 306 of body 302. Second ends 316 of channels 312 are located at first end 304 of body 302. Channels 312 are configured to receive fluid from a deicing system at first ends 314. Adjacent channels 312 may be angled relative to one another such that various pairs of second ends 316 meet and form outlets at first end 304 of body 302. Stated differently, in various embodiments, channels 312 may be oriented in a "V" configuration, similar to channels 212 in FIG. 4 and channels 102 in FIG. 3A. An apex of each V formed by channels 312 may be located at first end 304 of body 302.

Each channel 312 of runback system 300 may include a floor 328 and a pair of walls 330. Walls 330 extend from floor 328 to distal surface 310 of body 302. In various embodiments, a height of body 302, as measured from distal surface 310 to proximal surface 308, may be approximately uniform between first end 304 and second end 306 of body 302. As used in the previous context, the term "approximately" means ±2%. For example, body 302 has a height H4 at first end 304 and a height H5 at second end 306 with height H4 being equal to height H5. In various embodiments, floor 328 of channels 312 may be configured to have a downward slope in the direction extending from second end 306 to first end 304 of body 302. For example, a distance between floor 328 and proximal surface 308 of body 302 may decrease in the direction extending from second end 306 to first end 304 of body 302. In various embodiments, the downward slope of floor 328 causes a distance between floor 328 and distal surface 310 of body 302 to increase in the direction extending from second end 306 to first end 304 of body 302.

The water exiting runback system 300 may flow in the forward to aft direction, as opposed to the spanwise direction. In this regard, the V configuration of channels 312 directs the runback into multiple discrete points. If/when the runback refreezes, it will form individual buttons of ice extending in the forward to aft direction, as opposed to forming a spanwise ridge.

Benefits, other advantages, and solutions have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pneumatic deicer, comprising:
   a forming layer defining a volume configured to inflate and to deflate; and
   a covering layer located over the forming layer, the covering layer defining a runback system including a plurality of channels, wherein a first channel of the plurality of channels is defined by a floor and a pair of walls extending from the floor to an outer surface of the covering layer, and wherein the floor of the first channel is sloped such that a distance between the floor of the first channel and an inner surface of the covering layer decreases in a forward to aft direction, the inner surface of the covering layer being opposite the outer surface of the covering layer.

2. The pneumatic deicer of claim 1, wherein the covering layer comprises an elastomeric material.

3. The pneumatic deicer of claim 1, wherein the first channel of the plurality of channels and a second channel of the plurality of channels are oriented in a V configuration.

4. The pneumatic deicer of claim 3, wherein an aft end of the first channel and an aft end of the second channel meet and form an outlet at an aft end of the covering layer.

5. The pneumatic deicer of claim 1, wherein the covering layer is tapered such that a height of the covering layer extending from the inner surface of the covering layer to the outer surface of the covering layer decreases in the forward to aft direction.

6. The pneumatic deicer of claim 1, wherein a distance between the floor of the first channel and the outer surface of the covering layer increases in the forward to aft direction.

7. An aircraft part, comprising:
   a deicing system; and
   a runback system configured to receive fluid from the deicing system, the runback system comprising a first channel and a second channel, wherein the first channel is oriented at an angle relative to the second channel, and wherein a forward end of the first channel is spaced apart from a forward end of the second channel, and wherein an aft end of the first channel and an aft end of the second channel meet and form an outlet of the runback system.

8. The aircraft part of claim 7, wherein the deicing system comprises a pneumatic deicer, the pneumatic deicer including:
- a forming layer defining a volume configured to inflate and to deflate; and
- a covering layer located over the forming layer.

9. The aircraft part of claim 8, wherein the covering layer defines the runback system.

10. The aircraft part of claim 8, wherein an aft end of the covering layer is located adjacent a forward end of the runback system.

11. The aircraft part of claim 7, wherein a distal surface of the runback system is tapered such that a first height of the runback system at a forward end of the runback system is greater than a second height of the runback system at an aft end of the runback system.

12. The aircraft part of claim 7, wherein a proximal surface of the runback system is affixed to a surface of the aircraft part.

13. The aircraft part of claim 7, wherein the aircraft part comprises a wing of an aircraft.

14. The aircraft part of claim 7, wherein the aircraft part comprises at least one of a horizontal stabilizer, a vertical stabilizer, or a nacelle inlet.

15. The aircraft part of claim 7, wherein the deicing system comprises an electrothermal deicer.

16. A runback system configured to receive fluid from a deicing system, the runback system comprising:
- a body;
- a first channel defined by the body; and
- a second channel defined by the body, wherein a first end of the first channel is spaced apart from a first end of the second channel, and wherein a second end of the first channel and a second end of the second channel meet and form an outlet at a first end of the body.

17. The runback system of claim 16, wherein the first channel comprises:
- a floor; and
- a pair of walls extending from the floor to a first surface of the body.

18. The runback system of claim 17, wherein a distance between the floor and a second surface of the body opposite the first surface of the body decreases in a direction extending from a second end of the body to the first end of the body, the second end of the body being located opposite the first end of the body.

19. The runback system of claim 17, wherein the body is tapered such that a height of the body extending from the first surface of the body to a second surface of the body opposite the first surface decreases in a direction extending from a second end of the body to the first end of the body, the second end of the body being located opposite the first end of the body.

* * * * *